(12) United States Patent
Fröberg Olsson et al.

(10) Patent No.: US 10,057,895 B2
(45) Date of Patent: Aug. 21, 2018

(54) METHOD AND DEVICES FOR MITIGATING ERROR PROPAGATION IN TRANSMISSION ASSIGNMENTS

(71) Applicant: Telefonaktiebolaget L M Ericsson (publ), Stockholm (SE)

(72) Inventors: Jonas Fröberg Olsson, Ljungsbro (SE); Erik Eriksson, Linköping (SE); Pål Frenger, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 220 days.

(21) Appl. No.: 14/902,258

(22) PCT Filed: Nov. 11, 2015

(86) PCT No.: PCT/SE2015/051197
§ 371 (c)(1),
(2) Date: Dec. 30, 2015

(87) PCT Pub. No.: WO2017/065664
PCT Pub. Date: Apr. 20, 2017

(65) Prior Publication Data
US 2017/0105197 A1    Apr. 13, 2017

Related U.S. Application Data

(60) Provisional application No. 62/240,953, filed on Oct. 13, 2015.

(51) Int. Cl.
*H04W 72/04* (2009.01)
*H04L 27/18* (2006.01)
(Continued)

(52) U.S. Cl.
CPC ......... *H04W 72/042* (2013.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS 8,761,109 B2 *   6/2014   Nory ................. H04W 72/0406
                                                            370/329
9,642,159 B1 *   5/2017   Ramamurthy .... H04W 72/0406
(Continued)

FOREIGN PATENT DOCUMENTS

EP        2914043  A2   9/2015
WO   2017034453  A1   3/2017

*Primary Examiner* — Saba Tsegaye
(74) *Attorney, Agent, or Firm* — Murphy, Bilak & Homiller, PLLC

(57) ABSTRACT

A method in a wireless communication device for communication with a radio network node comprises receiving (210) of a first downlink control information on a first assignment. The first downlink control information comprises a reference to a second assignment, on which a second downlink control information is assigned to be received. It is determined (220) if the second downlink control information is obtainable. An indication indicating whether or not the second downlink control information was obtainable is transmitted (230) to the radio network node. A method in the radio network node for communication with the wireless communication device comprises transmitting of the first and second downlink control information. It is determined whether or not the second downlink control information was obtainable by the wireless communication device and based in this, a third downlink control information is transmitted on a third assignment. Corresponding devices and computer programs are also described.

38 Claims, 9 Drawing Sheets

(51) Int. Cl.
    *H04L 5/00*     (2006.01)
    *H04L 1/18*     (2006.01)
    *H04L 5/14*     (2006.01)
(52) U.S. Cl.
    CPC ............... *H04L 5/14* (2013.01); *H04L 27/18* (2013.01); *H04W 72/0446* (2013.01)

(56) References Cited

U.S. PATENT DOCUMENTS

| | | |
|---|---|---|
| 2010/0254268 A1 | 10/2010 | Kim et al. |
| 2010/0331037 A1* | 12/2010 | Jen ................ H04W 52/146 455/522 |
| 2011/0044278 A1* | 2/2011 | Astely ............... H04L 1/1621 370/329 |
| 2012/0201216 A1* | 8/2012 | Wu .................. H04L 1/0072 370/329 |
| 2012/0250551 A1 | 10/2012 | Sartori et al. |
| 2013/0039272 A1 | 2/2013 | Chen |
| 2013/0163537 A1* | 6/2013 | Anderson ......... H04W 72/1284 370/329 |
| 2014/0254410 A1 | 9/2014 | Seo et al. |

* cited by examiner

METHOD AND DEVICES FOR MITIGATING ERROR PROPAGATION IN TRANSMISSION ASSIGNMENTS

TECHNICAL FIELD

The proposed technology generally relates to wireless communication devices for communication with a radio network node, methods in a wireless communication device for communication with a radio network node, radio network nodes for communication with a wireless communication device and methods in a radio network node for communication with a wireless communication device. In particular, the proposed technology relates to methods and devices for mitigating error propagation in transmission assignments.

BACKGROUND

In wireless communication network, information about the format in which the data is to be communicated between network nodes is transmitted as control information in a specified and known way. The receiving node, e.g. a User Equipment (UE) in a Long Term Evolution (LTE) network, first decodes the control information, also referred to as a grant, which control information contains information on the transport format of the transmitted downlink data and/or the data to be transmitted uplink. Examples of the formatting information are allocation, i.e. where the data is located, typically in frequency, number of layers used, modulation and coding information, and HARQ process index.

In LTE networks, the grant is transmitted on a Physical Downlink Control Channel (PDCCH) or an enhanced Physical Downlink Control Channel (ePDCCH) using a variety of Downlink Control Information (DCI) formats which are specific to different operating modes of the UE. For example, in the random access procedure the Enhanced NodeB (eNB), when sending a random access response to the UE, uses a DCI format 1A. The eNB uses this format since this is known to all UEs and the eNB does not know the actual capabilities of the UE when sending the random access response. Later in the call setup procedure the eNB learn the UE capabilities and can start using a more advanced DCI format.

A grant received on PDCCH/ePDCCH is relative a specific subframe (except semi-persistent grants that are relative multiple subframes). For downlink (DL) the grant is typically specific to same subframe n in which the grant was detected, while for uplink (UL) the grant is typically specific to a future subframe n+a. Usually a=4.

In some scenarios it would be desired to send the next grant inside a granted PDCH transmission. Such a nested scenario of grants will in the present disclosure be denoted as a "daisy chain". However, the daisy chain scheme suffers from error propagation.

If UE fails to detect the first grant on PCCH the UE will also fails to detect sub-sequent transmissions on PDCH, and the UE will not send anything in UL either. Error propagation can be terminated due to that eNB detects that UE does not perform a granted UL transmission. Although that error propagation can be terminated after some time the performance loss can still be significant. Hence, a better method for mitigating error propagation is needed before a daisy-chain scheme can provide acceptable performance.

SUMMARY

It is thus an object to provide improved mitigation of error propagation in a process where a first downlink control information comprises a reference to a second assignment, on which a second downlink control information is assigned to be received.

This and other objects are met by embodiments of the proposed technology.

According to a first aspect, there is provided a method in a wireless communication device for communication with a radio network node. The method comprises receiving of a first downlink control information on a first assignment from the radio network node. The first downlink control information comprises a reference to a second assignment from the radio network node on which a second downlink control information is assigned to be received. It is determined if the second downlink control information is obtainable by the wireless communication device. An indication indicating whether or not the second downlink control information was obtainable is transmitted to the radio network node.

According to a second aspect, there is provided a method in a radio network node for communication with a wireless communication device. The method comprises transmitting of a first downlink control information on a first assignment to the wireless communication device. The first downlink control information comprises a reference to a second assignment. A second downlink control information is transmitted on the second assignment to the wireless communication device. It is determined whether or not the second downlink control information was obtainable by the wireless communication device. A third downlink control information is transmitted on a third assignment based on the determining whether or not the second downlink control information was obtainable by the wireless communication device.

According to a third aspect, there is provided a wireless communication device, configured to receive a first downlink control information on a first assignment from a radio network node. The first downlink control information comprises a reference to a second assignment from the radio network node on which a second downlink control information is assigned to be received. The wireless communication device is further configured to determine if the second downlink control information is obtainable by the wireless communication device and to transmit, to the radio network node, an indication indicating whether or not the second downlink control information was obtainable.

According to a fourth aspect, there is provided a radio network node, configured to transmit a first downlink control information on a first assignment to a wireless communication device. The first downlink control information comprises a reference to a second assignment. The radio network node is further configured to transmit a second downlink control information on the second assignment to the wireless communication device, to determine whether or not the second downlink control information was obtainable by the wireless communication device, and to transmit a third downlink control information on a third assignment based on the determining whether or not the second downlink control information was obtainable in the wireless communication device.

According to a fifth aspect, there is provided a computer program comprising instructions, which when executed by at least one processor, cause the at least one processor to receive a first downlink control information on a first assignment from a radio network node, the first downlink control information comprises a reference to a second assignment from the radio network node on which a second downlink control information is assigned to be received, to determine if the second downlink control information is obtainable by the wireless communication device, and to transmit an indication indicating whether or not the second downlink control information was obtainable by the wireless communication device.

According to a sixth aspect, there is provided a computer program comprising instructions, which when executed by at least one processor, cause the at least one processor to transmit a first downlink control information on a first assignment to a wireless communication device, the first downlink control information comprises a reference to a second assignment, to transmit a second downlink control information, on the second assignment to the wireless communication device, to determine whether or not the second downlink control information was obtainable by the wireless communication device, and to transmit a third downlink control information on a third assignment based on said determining whether or not the second downlink control information was obtainable in the wireless communication device.

According to a seventh aspect, there is provided a computer-program product comprising a computer-readable medium having stored thereon a computer program according to the fifth or sixth aspect.

According to an eight aspect, there is provided a carrier comprising the computer program of the fifth or sixth aspect, wherein the carrier is one of an electronic signal, an optical signal, an electromagnetic signal, a magnetic signal, an electric signal, a radio signal, a microwave signal, or a computer-readable storage medium.

According to a ninth aspect, there is provided a wireless communication device, comprising a receiver for receiving a first downlink control information on a first assignment from a radio network node. The first downlink control information comprises a reference to a second assignment from the radio network node on which a second downlink control information is assigned to be received. The wireless communication device further comprises a determining module for determining if the second downlink control information is obtainable by the wireless communication device, and a transmitter for transmitting an indication indicating whether or not the second downlink control information was obtainable by the wireless communication device.

According to a tenth aspect, there is provided a radio network node, comprising: a transmitter for transmitting a first downlink control information on a first assignment to a wireless communication device. The first downlink control information comprises a reference to a second assignment. The transmitter is further for transmitting a second downlink control information on the second assignment to the wireless communication device. The radio network node further comprises a determination module for determining whether or not the second downlink control information was obtainable by the wireless communication device.

The transmitter is further for transmitting a third downlink control information on a third assignment based on the determining whether or not the second downlink control information was obtainable in the wireless communication device.

By detecting that a UE has missed one DCI message then the base station can conclude that other DCI messages transmitted at the same time, e.g. using the same physical channel and the same Cyclic Redundancy Check (CRC), are also probably lost. An advantage of the proposed technology is thus that any errors in a chain of nested DCI are discovered early and a fast recovery is enabled.

Other advantages will be appreciated when reading the further description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of the present use of daisy chains and/or analysis of the technical problem.

Figure 1:
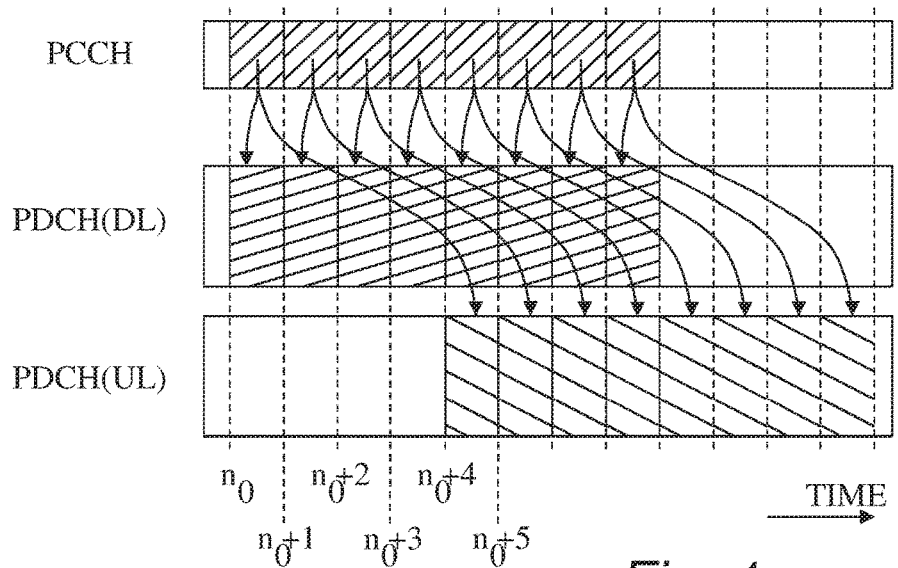
FIG. 1 is an illustration of data transmissions relating to a specific UE.

FIG. 1 is an illustration of data transmissions relating to a specific UE in a Frequency Division Duplex (FDD) system. The arrows illustrate which DL respective UL transmission respective grant transmitted on the Physical Control Channel (PCCH) relate to. Here a=4 is illustrated, i.e. an uplink grant provided on the PCCH in sub-frame n is valid for uplink transmission in sub-frame n+4.

FIG. 1 thus illustrates a FDD system with a downlink PCCH and two Physical Data Channels (PDCHs), one for DL and one for UL. One DL and one UL grant is transmitted in each subframe during the session in which the UE has data. The scenario illustrated is a DL data session wherein the UE has downlink data to be transmitted for 8 subframes. The UL grants are present for the UE to provide Hybrid Automatic Repeat-reQuest (HARQ) feedback, and possibly also Channel-State Information (CSI) feedback and higher layer feedback, to the eNB.

As mentioned above, in some scenarios it would be desired to send the next grant inside a granted PDCH transmission. A UE will thereby receive a first DCI on a first assignment from the radio network node. That first DCI comprises a reference to a second assignment from the radio network node on which a second DCI is assigned to be received, i.e. a "daisy chain". Such an approach would offload PCCH due to that only the first PCCH transmission would occur during the session.

Figure 2:
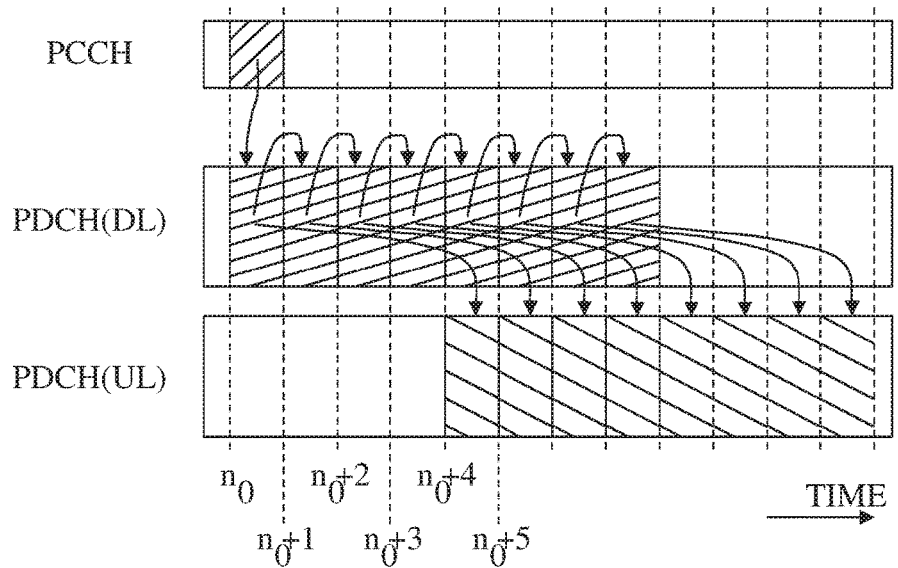
FIG. 2 illustrates daisy-chain grants transmitted inside granted PDCH transmission.

FIG. 2 illustrates daisy-chain grants transmitted inside granted PDCH transmission. Only one first grant on PCCH would be required to start the daisy chain. As a result, dimensioning of PCCH could be reduced and more resources could be allocated to PDCH resulting in increased throughput.

Figure 3:
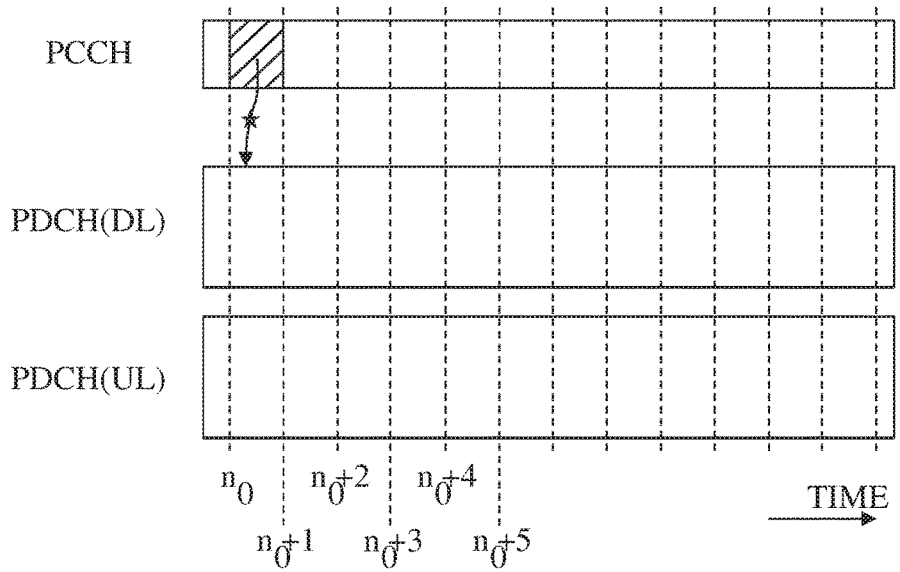
FIG. 3 illustrates error propagation in a daisy-chain.

FIG. 3 illustrates error propagation. If UE fails to detect the first grant on PCCH the UE will also fail to detect sub-sequent transmissions on PDCH, and the UE will not send anything in UL either.

Figure 4:
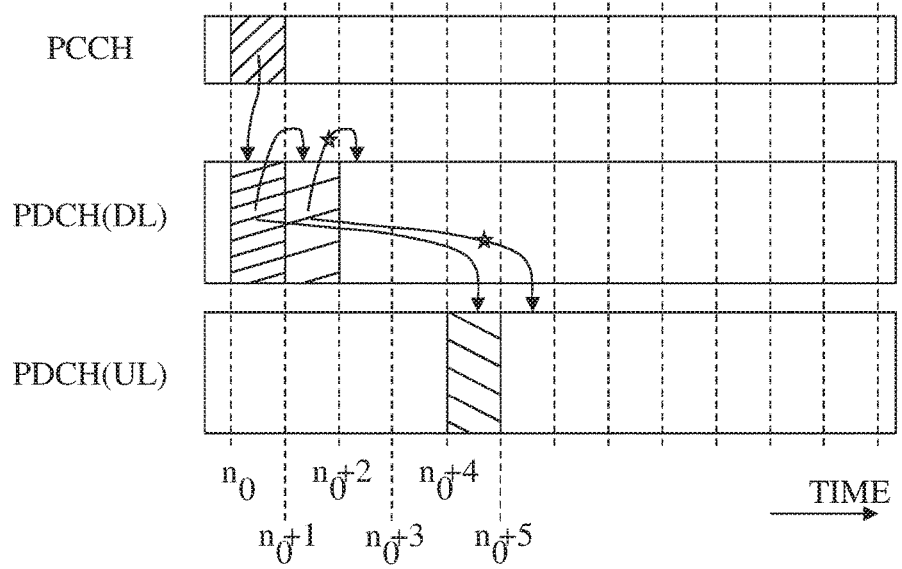
FIG. 4 illustrates error propagation if a UE fails to decode a second PDCH.

FIG. 4 illustrates error propagation if the UE fails to decode a second PDCH. As a result the UE stops receiving DL data for sub-frames $n \geq n_0+2$, where $n_0$ being the sub-frame where the initial PCCH transmission took place. Furthermore, the UE will not have a grant for uplink transmission in sub-frame $n_0+5$.

Figure 5:
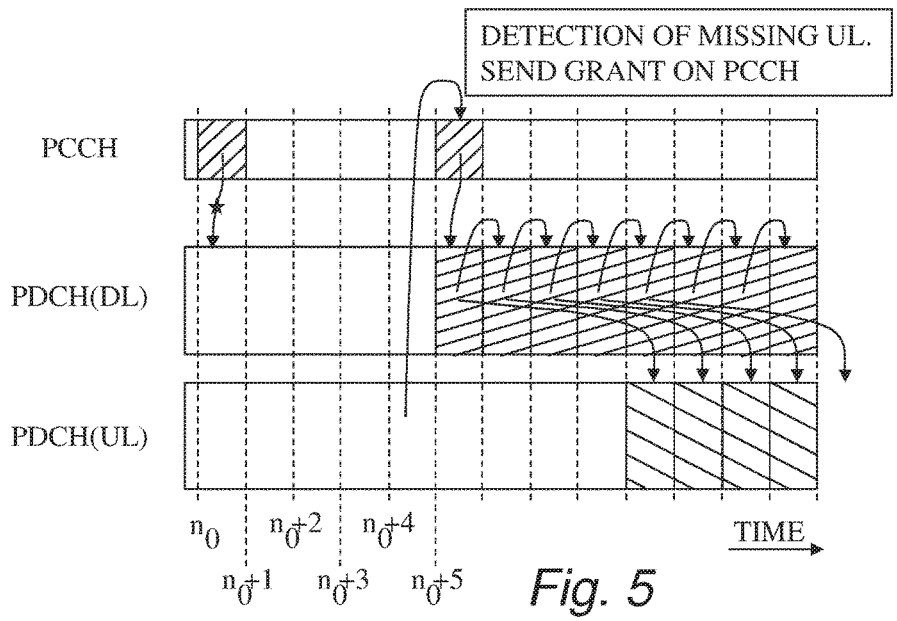
FIG. 5 illustrates possible error recovery in a daisy-chain.

FIG. 5 illustrates a possible error recovery. eNB knows it scheduled the UE in UL subframe $n_0+4$ and can hence detect a missing UL transmission from the UE and can therefore recover from error propagation in this particular scenario. FIG. 5 thus illustrates a scenario wherein error propagation can be terminated due to that eNB detects that UE does not perform a granted UL transmission. The method of detecting missing UL grants has been used to enable link adaptation on the control channel (e.g. PDCCH/ePDCCH in LTE). Although that error propagation can be terminated after some time, as mentioned above, the performance loss can still be significant.

The performance loss can be reduced by shortening the time it takes for the radio network node to realize that there is an error in the nested scenario of grants. A set of nested grants are transmitted by a radio network node to a wireless communication device. The wireless communication device is instructed, implicitly or explicitly, to determine if the downlink control information in the nested grants is obtainable by the wireless communication device. This can be performed very quickly. An indication indicating whether or not the second downlink control information was obtainable may therefore be transmitted back to the radio network node very soon after the reception of the nested grants, typically in a following transmission time interval, but in certain cases even in a present transmission time interval. The radio network node can then by monitoring the reception of indications or the absence of expected indications perform an early detection of an error. The radio network node may therefore initiate a process for compensating the errors faster than what has been possible in prior art systems.

The alternatives how to perform the communication, on which resources and under what circumstances, are many. Some of them will be described more in detail in the different descriptions of embodiments here below.

Figure 6:
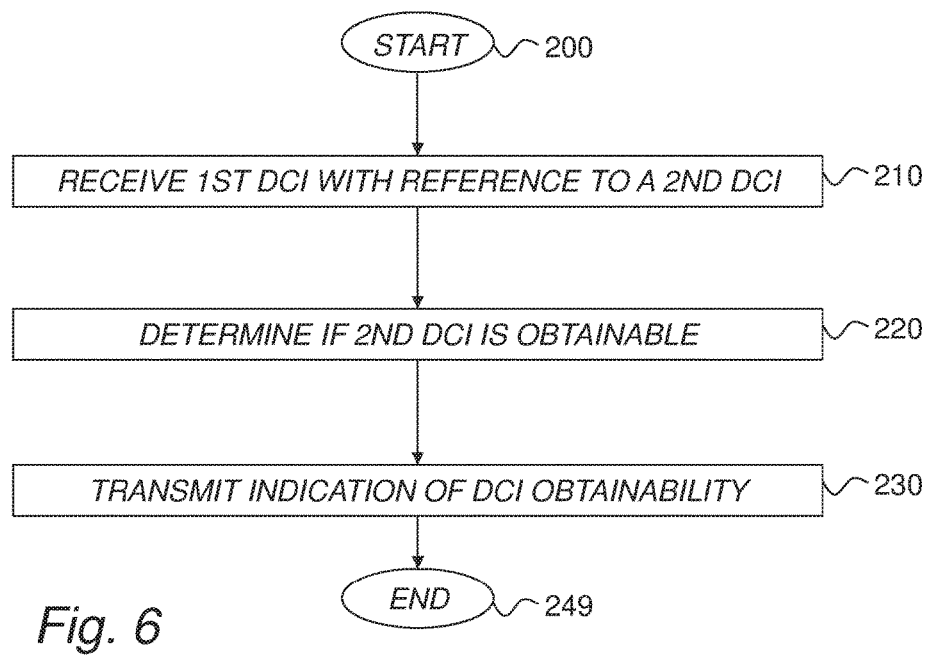
FIG. 6 is a schematic flow diagram illustrating an embodiment of a method in a wireless communication device for communication with a radio network node.

FIG. 6 is a schematic flow diagram illustrating an embodiment of a method in a wireless communication device for communication with a radio network node. The process starts in step 200. The method comprises in step 210 receiving of a first downlink control information on a first assignment from the radio network node. The first downlink control information comprises a reference to a second assignment from the radio network node. On this second assignment, a second downlink control information is assigned to be received.

This may correspond to a part of a daisy chain. In one alternative, the first DCI on the first assignment can be the original DCI sent on a control channel. In other words, the first assignment is an assignment in a physical control channel. The second DCI on the second assignment can be the first DCI in the daisy chain transmitted on the data channel. In another alternative, the first DCI on the first assignment can be a DCI sent on a control channel, e.g. in the middle of a daisy chain. In other words, the first assignment is an assignment in a physical data channel. The second DCI on the second assignment is then the next DCI in the daisy chain transmitted on the data channel. In both these alternatives, the second assignment is an assignment in a physical data channel.

The embodiment of FIG. 6 then further comprises step 220 of determining if the second downlink control information is obtainable by the wireless communication device. Finally, in step 230 an indication indicating whether or not the second downlink control information was obtainable is transmitting to the radio network node. The process is ended in step 249.

One particular embodiment of a method in a wireless communication device that is capable of receiving assignments from a radio network node on a physical control channel and one or more scheduled physical data channels comprises obtaining of a grant for transmission of an "inband-control reception" indicator. The grant may utilize a contention based channel, an explicit control channel, a specific reference signal, or an inband-control message, or a channel explicitly encoded in the standard. The method further comprises transmitting of an "inband-control reception" indicator using the grant indicating success and/or failure of inband-control reception. The inband-control messages can be transmitted on the one or more physical data channels. The encoding of the message may be on/off keying or Binary Phase Shift Keying (BPSK).

Here many different alternatives are possible. One particular example could be that a UL resource, as a part of the second DCI, is granted for transmitting an indication. If a UE is not transmitting on such a granted UL resource, this indicates to the base station that DCIs corresponding to the DCI transmissions were lost as well as any additional DCI messages that were embedded in the lost transmissions.

A UE that was given a dynamically scheduled UL resource may use a contention based resource for transmitting the indication. Such transmissions could be limited to occasions when faults are detected, e.g. when granted DCIs are not obtainable by the UE, and/or at the start and end of a daisy chain.

In another embodiment, a UE that has a UL grant for frame n+1, provided earlier, was expecting to receive a DL transmission in frame n but no such transmission was received. In that case the UE may send a special message to the base station, using the grant it has, indicating that any DCIs transmitted in sub-frame n were lost. The special message may in a particular embodiment comprise an extension of the message intended for the granted resource comprising the indication.

As mentioned further above, in situations like these the base station need to recover from the error event chain by sending a new DCI on a channel that is outside of the control information daisy chain, e.g. on the PCCH.

Figure 7:
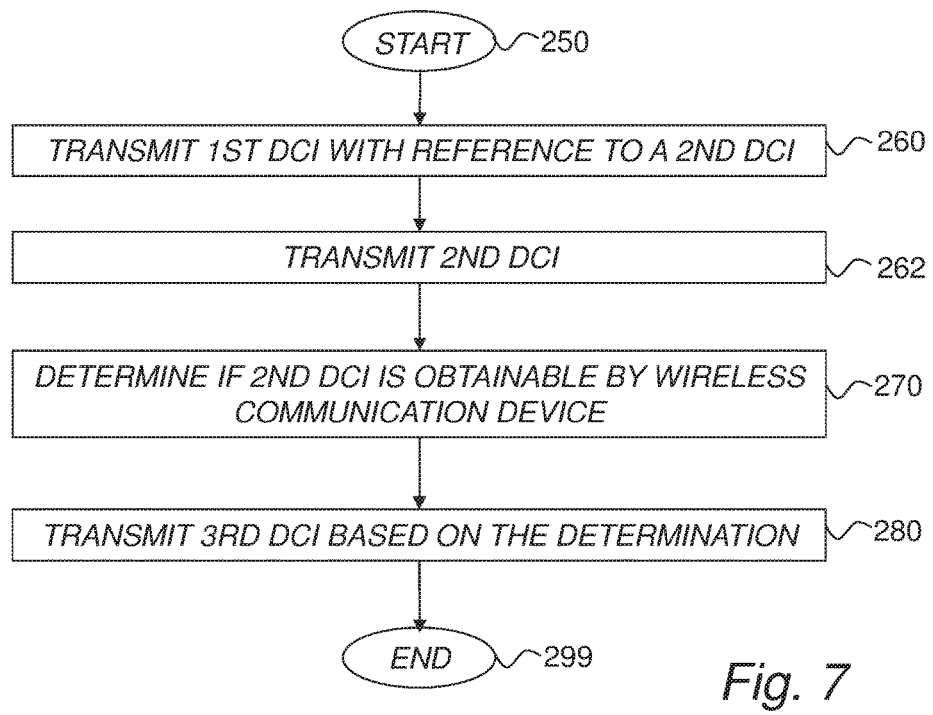
FIG. 7 is a schematic flow diagram illustrating an embodiment of a method in a radio network node for communication with a wireless communication device.

FIG. 7 is a schematic flow diagram illustrating an embodiment of a method in a radio network node for communication with a wireless communication device. The process starts in step 250. The method comprises step 260 of transmitting of a first downlink control information on a first assignment to the wireless communication device. The first downlink control information comprises a reference to a second assignment. The method further comprises step 262 of transmitting of a second downlink control information on the second assignment to the wireless communication device.

This may correspond to a part of a daisy chain. In one alternative, the first DCI on the first assignment can be the original DCI sent on a control channel. In other words, the first assignment is an assignment in a physical control channel. The second DCI on the second assignment can be the first DCI in the daisy chain transmitted on the data channel. In another alternative, the first DCI on the first assignment can be a DCI sent on a control channel, e.g. in the middle of a daisy chain. In other words, the first assignment is an assignment in a physical data channel. The second DCI on the second assignment is then the next DCI in the daisy chain transmitted on the data channel. In both these alternatives, the second assignment is an assignment in a physical data channel.

The embodiment of FIG. 7 then further comprises step 270 of determining whether or not the second downlink control information was obtainable by the wireless communication device. In step 280, a third downlink control information is transmitted on a third assignment based on the determining whether or not the second downlink control information was obtainable in the wireless communication device. The process ends in step 299.

In one embodiment, a method in a base station comprises, in addition to the normal transmissions of a daisy chain, receiving of an "inband-DCI reception" indicator from a UE. The method further comprises transmitting of a new control messages on a control channel or a data channel in dependence of the indicator. This new control message could e.g. be transmitted in response to a negative "inband-control reception" indicator from the UE. The next DCI transmission is preferably performed on the physical control channel. In response to a positive "inband-control reception" indicator from the UE, the next DCI transmission can instead be performed at a physical data channel, in accordance with the original daisy chain.

In some particular embodiments the base station provides a grant for the indicator explicitly to the mobile station.

In one embodiment, the UE transmits second indicator until UE receives an assignment on physical control channel.

In some embodiments, the base station determines which control messages should have been received during a normal session but that were not received. The new control messages on the control channel may then be derived in dependence on the not received control messages.

In one embodiment, the transmitting of a third downlink control information comprises transmitting the third downlink control information as a response to a determination that the second downlink control information was not obtainable by the wireless communication device.

In a further embodiment, the third downlink control information then comprises an initiation of a resending of messages associated with the second downlink control information.

In another embodiment, the transmitting of a third downlink control information comprises transmitting a next DCI in the daisy chain as the third downlink control information, as a response to a determination that the second downlink control information was obtainable by the wireless communication device.

In one embodiment, the radio network node detects a daisy chain error event when the UE is using a contention based channel even though it is assigned a dedicated uplink grant.

In one embodiment, the fact that error events related to DCIs that are transmitted using a common CRC are correlated are utilized. One example is if a DL grant for sub-frame n is reported as missing, then UL grant for sub-frame n+a is also lost, especially in case they were jointly encoded.

Figure 8:
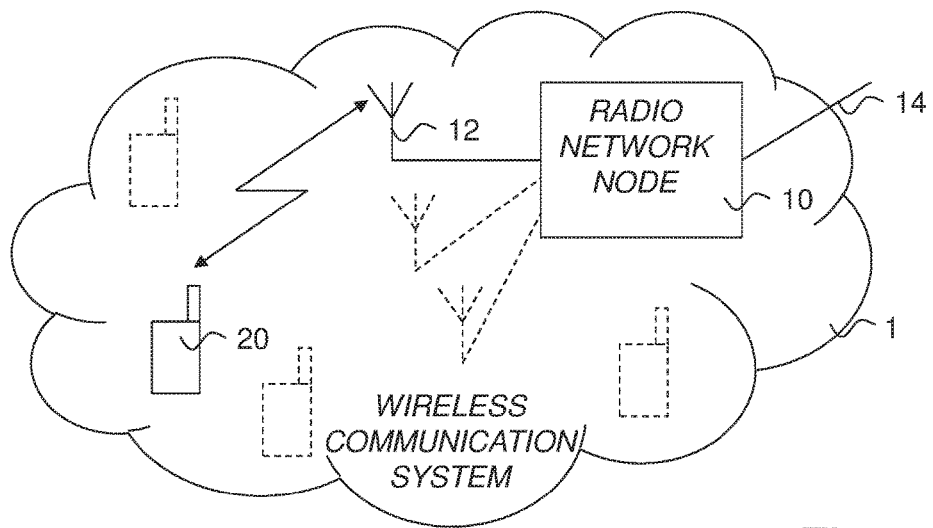
FIG. 8 is a schematic illustration of a wireless communication system 1.

FIG. 8 is a schematic illustration of a wireless communication system 1. A radio network node 10 is, by transmitting and receiving radio signals via an antenna 12, in radio contact with a wireless communication device 20. The radio network node 10 is in further contact, as illustrated by the line 14, with other nodes of the wireless communication system 1. The radio network node 10 may be in contact with several wireless communication devices, as indicated by the broken line figures. The radio network node 10 can thus send e.g. downlink control information to a group of wireless communication devices 20.

The radio network node 10 may in particular embodiments control the transmission from more than one antenna, as indicated by the broken line figures. The radio network node 10 should be considered as a logical node controlling potentially many physical nodes. For example, the radio network node 10 can control several transmission points, e.g., antenna sites, and a control message could be sent from any of the transmission points.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "radio network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

It will be appreciated that the methods and devices described herein can be combined and re-arranged in a variety of ways.

Figure 9:
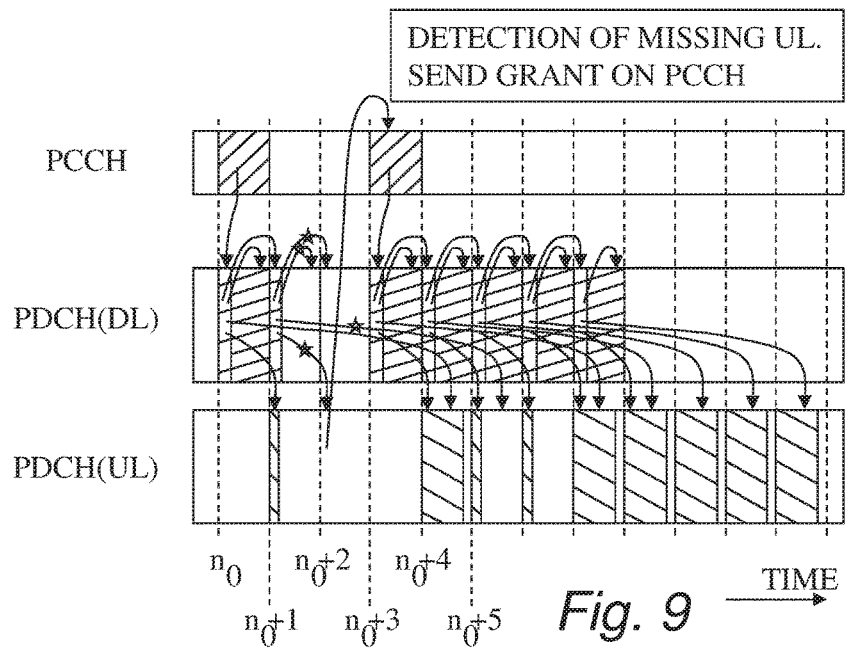
FIG. 9 illustrates an embodiment of a daisy-chain status grant approach for early recovery.

In FIG. 9, the events and signaling of an embodiment of a daisy chain status grant approach for early recovery are illustrated. Early recovery can in short be achieved due to that the eNB knows it has scheduled the UE for daisy chain status grant for UL subframe $n_0+2$ and can hence detect a missing UL transmission from the UE. The eNB can therefore recover from error propagation in this particular scenario. Subframe $n_0+4$ illustrate that 'normal' UL grants are given priority over daisy chain status grants.

In a preferred version of this embodiment, the physical data channel is as illustrated consisting of two parts, a direct and a re-transmittable field, that are separately encoded. These two parts can be viewed as two physical data channels. A direct channel, direct Physical Data Channel (dPDCH), is transmitted preferably in a first part of OFDM symbols within the TTI while a re-transmittable channel, re-transmittable Physical Data Channel (rPDCH), is transmitted in the remaining Orthogonal Frequency-Division Multiplexing (OFDM) symbols. The first channel dPDCH carries typically data for which decoding-related information need not be retained by a receiving node in the event of an unsuccessful decoding of data. The second channel rPDCH carries retransmittable data, i.e. data that will be retransmitted in the event that a negative acknowledgement is received by a transmitting node, or in some cases in the event that an acknowledgement is not received. For the rPDCH, the decoding-related information can be retained by the receiving node in the event of an unsuccessful decoding of data, for use in combining with decoding-related information obtained when decoding the corresponding retransmitted data. The dPDCH and rPDCH can each in principle carry both control and user data. In the present application, a preferred implementation is to let the dPDCH comprise the DCI potentially additionally to data, while the rPDCH is intended for user data.

This preferred version is a case wherein the indication possibly could be sent during same transmission time interval as the grant, i.e. the assignment, was received FIG. 9 illustrate such scenario wherein the dPDCH corresponds to the first part of each Transmission Time Interval (TTI) of the DL PDCH while rPDCH corresponds to the second part of each TTI of the UL PDCH.

In other embodiments, the DCI may be comprised in rPDCH.

Returning to FIG. 9, when the eNB wants to initialize a daisy chain scheme it sends a grant on PCCH that grants the dPDCH. On the dPDCH the eNB includes a grant for next dPDCH. In this particular embodiment, the dPDCH further comprises a grant for rPDCH, and an UL grant that enables the UE to transmit the HARQ feedback for the (current) granted rPDCH transmission.

The scheme has some similarities to the scheme illustrated in FIG. 2, but FIG. 2 does not show the dPDCH and rPDCH channels. In addition, the eNB also include an additional UL grant that grants a UL transmission occurring earlier than the granted UL transmission for sending HARQ feedback. This additional UL grant can be viewed as a daisy chain status grant that enable early detection of error propagation. In other words, in the radio network node, the procedure comprises the step of transmitting, to the wireless communication device, a request for transmitting an indication indicating whether or not the second downlink control information was obtainable by the wireless communication device.

As illustrated in the FIG. 9, this embodiment of the method enables early recovery of an error. The eNB sends a grant on PCCH in subframe $n_0$ and the dPDCH subframe $n_0$ contains four grants: rPDCH grant, HARQ feedback grant, the next dPDCH grant and the daisy chain status grant. Since the data granted by the daisy chain status grant preferably is small the UE should be able to perform an UL transmission far before it could be prepared to send HARQ feedback or large payload data, probably being capable of performing such a transmission already in the next subframe $n_0+1$, as illustrated in the figure.

In an alternative embodiment, the transmission may be performed already in the same subframe $n_0$.

In the embodiment of FIG. 9, the steps of determining if the second downlink control information is obtainable by the wireless communication device and transmitting an indication to said radio network node, which indication indicates whether or not the second downlink control information was obtainable, are requested by an indicator request in a downlink control information. In particular, the indicator request comprises in this embodiment a resource assignment for the transmitting of the indication.

9 also illustrate that the UE fails to decode the dPDCH in subframe $n_0+1$ and therefore does not receive the daisy chain status grant for subframe $n_0+2$. The missing UL transmission in subframe $n_0+2$ enable the eNB to detect that the daisy chain is broken and can hence re-initialize the daisy chain again in subframe $n_0+3$. After that, the UE correctly decode dPDCH and receives the grants.

In the embodiment of FIG. 9, the step of determining whether or not the second downlink control information was obtainable by the wireless communication device comprises determining an absence of an indication from the wireless communication device indicating that the second downlink control information was obtainable by the wireless communication device when such an indication was expected to be received.

In an alternative embodiment, the steps of determining if the second downlink control information is obtainable by the wireless communication device and transmitting an indication to said radio network node, which indication indicates whether or not said second downlink control information was obtainable, are requested by a configuration message sent from the radio network node to the wireless communication device.

In FIG. 9, in subframe $n_0+4$ the UE does not perform the UL transmission according to the daisy chain status grant since it already has an UL grant, received already in subframe no. Hence, the UE is in this embodiment configured so that 'normal' UL grants have priority over daisy chain status grants.

In another embodiment, if a grant of a 'normal' UL transmission, e.g. a HARQ feedback, and a grant of a daisy chain status are scheduled to a same, the HARQ feedback may be modified to comprise also information concerning the daisy chain status. In other words, the indicator, if the resource assignment for the transmitting of the indication is assigned to a same assignment for an already granted uplink assignment, is incorporated in an uplink message on the same assignment for an already granted uplink assignment and the particular assignment for the transmitting of the indication is ignored.

Although the use of dPDCH and rPDCH is a preferred implementation, the basic technology of the present disclosure will also operate without this specific implementation. The DCI may then constitute the first portion of a data amount of the PDCH, which portion is interpreted by the wireless communication device as control data, comprising a grant of a further PDCH.

The daisy chain status grant may in some particular embodiments be implicit in the sense that no explicit grant is included in the dPDCH. Instead, it is the UE that detects a daisy chain grant, i.e. a grant for next subframe, in e.g. a dPDCH granted using PCCH. Hence, in such embodiments, the UE is configured to indicate to eNB that the daisy chain has been initialized, or in other words that the UE detected the daisy chain grant. In some such embodiments, the UE could send an indication by sending reference signals or a message, e.g. on a contention based channel. In other words, the steps of determining if the second downlink control information is obtainable by the wireless communication device and transmitting an indication to the radio network node, which indication indicates whether or not the second downlink control information was obtainable, are triggered by the second assignment simply being an assignment in a physical data channel.

The implicit daisy chain status grant can also be concluded by following a standard concerning different transmission modes. The steps of determining if the second downlink control information is obtainable by the wireless communication device and transmitting an indication to said radio network node, which indication indicates whether or not the second downlink control information was obtainable, are performed according to standard specifications for particular transmission modes. In other words, if certain transmission modes are used, standards may define that a daisy chain status is expected to be sent.

In one embodiment, the grants of a next DCI and/or a DL user data message may not comprise explicit assignments of particular channel elements on particular TTIs on particular channels. Instead, the grants may comprise information about adapted terminal-specific search spaces for the UE. A UE has typically a standard terminal-specific search space which is searched for possible messages to the UE. Upon starting a daisy chain, the grant of a future DCI may comprise an adaptation of that terminal-specific search space. The UE can then use this adapted terminal-specific search space to look e.g. for a subsequent control message. Such an adaptation of a terminal-specific search space may e.g. comprise the instructions to search for a subsequent control message on a number of channel elements in a downlink data channel.

Figure 10:
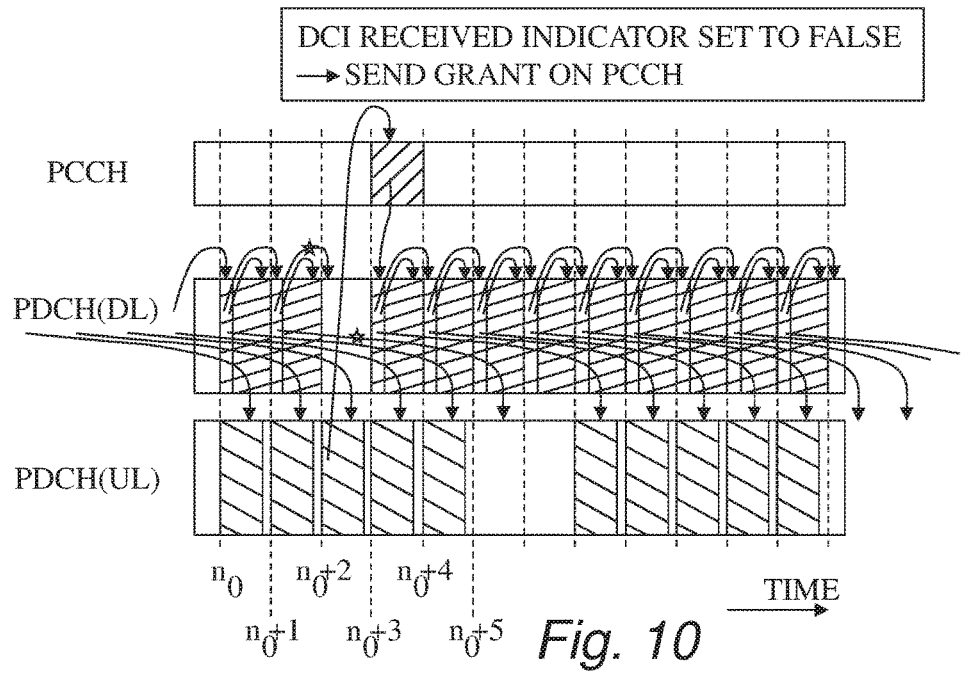
FIG. 10 illustrates that a previously granted resource can be used to indicate daisy chain status feedback.

FIG. 10 illustrates an embodiment of a daisy chain status feedback approach, where a previously granted resource, in sub-frame $n_0+1$, can be used to indicate daisy chain status feedback.

In the embodiment of FIG. 10, the UE is configured to send daisy chain indicator to eNB indicating the status of the daisy chain. The daisy chain indicator enables the eNB to early detect a broken daisy chain if for example the chain breaks in the middle when the UE already has grants for UL transmissions as illustrated in FIG. 10. The chain breaks in the subframe due to that decoding of dPDCH fails. The UE that has received a UL grant for subframe $n_0+1$ from a previous decoded transmission include a daisy chain status indicator in the transmission in $n_0+1$ in the figure.

In one embodiment, the grants of a next DCI and/or a DL user data message may not comprise explicit assignments of particular TTIs on particular channels. Instead, the grants may comprise information about adapted search spaces for the UE. A UE has typically a standard search space which is searched for possible messages to the UE. Upon starting a daisy chain, the grant of a future DCI may comprise an adaptation of the search space. The UE can then use this adapted search space to look e.g. for a subsequent control message.

In some other embodiments, a daisy chain broken indicator is transmitted on separate UL channel, e.g. a contention-based channel.

In other embodiments, the UE is not capable of sending daisy chain status indicator already in subframe $n_0+1$, but it send the indicator in subframe $n_0+2$ or $n_0+3$.

The daisy chain status indicator can be combined with the daisy chain status grant presented above wherein the status is indicated in the data transmitted due to the daisy chain status. The status indicator can in some embodiments be sent for every detected daisy chain grant, i.e. a grant received on PDCH, and in other examples be triggered by a failed decoding of a daisy chain granted PDCH. In some such other examples, transmission of the status indicator could be triggered when the daisy chain is initialized, i.e. when a grant for upcoming TTI is granted and the grant was detected on a PDCH granted on a PCCH, and if/when the daisy chain is broken, i.e. UE fails to decode daisy chain granted PDCH. In further such embodiments, the eNB may send a daisy chain grant to the UE but decided not to make the PDCH transmission. In such further examples, the UE sends the status indicator but keep trying to decode PDCH using its received daisy chain grant for future TTIs.

Thus, in particular embodiments, the transmitting of the indication is performed only if the second downlink control information was obtainable. In other particular embodiments, the transmitting of the indication is performed only if the second downlink control information was not obtainable. In such cases, where only one alternative is possible in the indication, transmitting of the indication may preferably be performed using ON/OFF signalling.

In embodiments, where the transmitting of the indication can be performed under different circumstances, the transmitting of the indication may preferably be performed using binary phase shift keying signalling.

The DCI can be comprised in the messages in different ways. In a particular embodiment, the first downlink control information is comprised in a medium access control element. Also in a particular embodiment, the second downlink control information is comprised in a medium access control element.

In one embodiment, in the radio network node, the step of determining whether or not the second downlink control information was obtainable by the wireless communication device comprises receiving of an indication from the wireless communication device indicating that the second downlink control information was not obtainable by the wireless communication device.

Embodiments of the devices may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a wireless communication device, configured to receive a first downlink control information on a first assignment from a radio network node. The first downlink control information comprises a reference to a second assignment from the radio network node on which a second downlink control information is assigned to be received. The wireless communication device is further configured to determine if the second downlink control information is obtainable by the wireless communication device, and to transmit an indication indicating whether or not the second downlink control information was obtainable to the radio network node.

According to an aspect of the proposed technology there is provided a radio network node, being configured to transmit a first downlink control information on a first assignment to a wireless communication device. The first downlink control information comprises a reference to a second assignment. The radio network node is further configured to transmit a second downlink control information on the second assignment to the wireless communication device, to determine whether or not the second downlink control information was obtainable by the wireless communication device, and to transmit a third downlink control information on a third assignment based on the determining whether or not be second downlink control information was obtainable in the wireless communication device.

Figure 11:
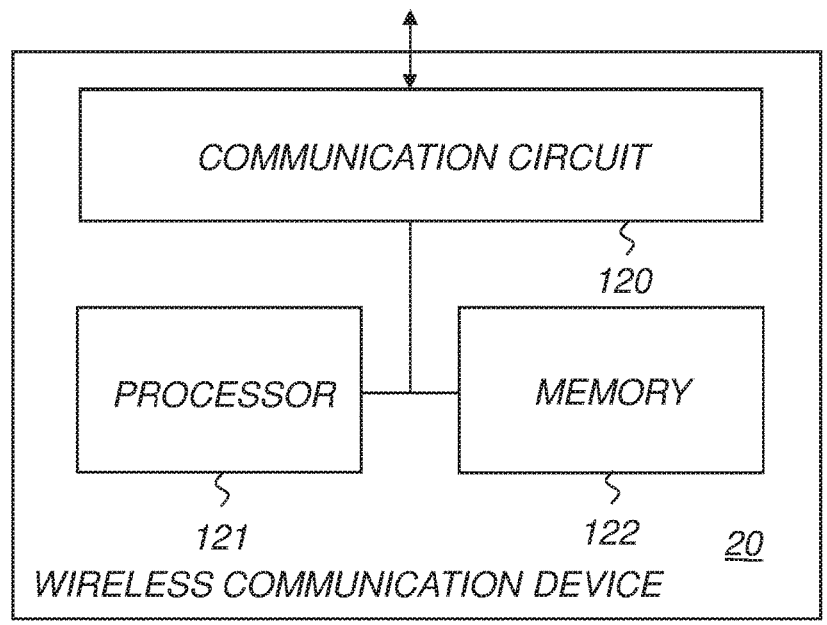
FIG. 11 is a schematic block diagram illustrating an embodiment of a wireless communication device.

FIG. 11 is a schematic block diagram illustrating an embodiment of a wireless communication device 20, based on a processor-memory implementation according to an embodiment. In this particular example, the wireless communication device 20 comprises a processor 121 and a memory 122, the memory 122 comprising instructions executable by the processor 121, whereby the processor is operative to determine if the second downlink control information is obtainable by the wireless communication device.

The wireless communication device 20 also includes a communication circuit 120. The communication circuit 120 includes functions for wireless communication with other devices and/or network nodes in the network. In a particular example, the communication circuit 120 may be based on radio circuitry for communication with one or more other nodes, including transmitting and/or receiving information. The communication circuit 130 may be interconnected to the processor 121 and/or memory 122. By way of example, the communication circuit 120 may include any of the following: a receiver, a transmitter, a transceiver, input/output (I/O) circuitry, input port(s) and/or output port(s). The communication circuit 120 is configured to receive the first downlink control information on the first assignment from the radio network node, and to transmit the indication indicating whether or not the second downlink control information was obtainable to the radio network node.

Figure 12:
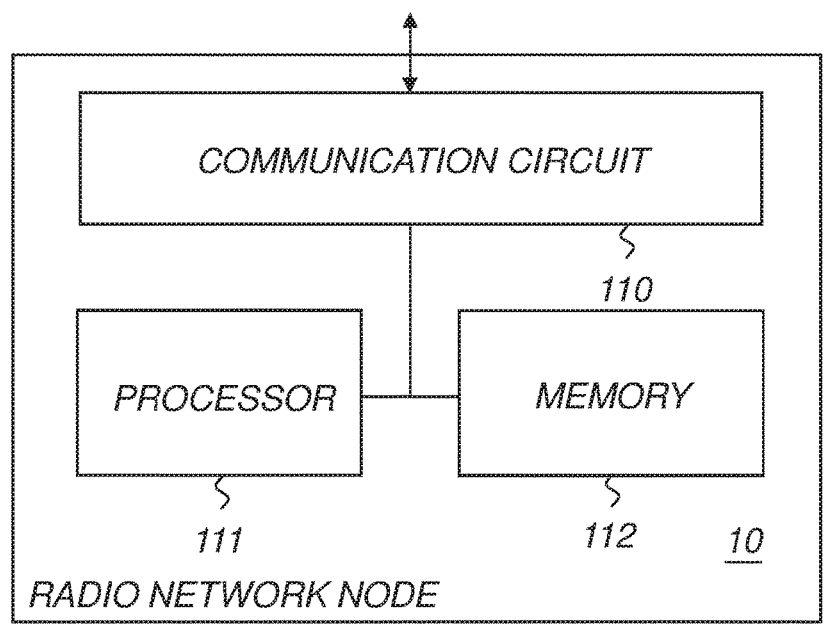
FIG. 12 is a schematic block diagram illustrating an embodiment of a radio network node.

FIG. 12 is a schematic block diagram illustrating an embodiment of a radio network node 10, based on a processor-memory implementation according to an embodiment. In this particular example, the radio network node 10 comprises a processor 111 and a memory 112, the memory 112 comprising instructions executable by the processor 111, whereby the processor is operative determine whether or not the second downlink control information was obtainable by the wireless communication device.

The radio network node 10 also includes a communication circuit 110. The communication circuit 110 includes functions for wireless communication with other devices and/or network nodes in the network. In a particular example, the communication circuit 110 may be based on radio circuitry for communication with one or more other nodes, including transmitting and/or receiving information. The communication circuit 110 may be interconnected to the processor 111 and/or memory 112. By way of example, the communication circuit 110 may include any of the following: a receiver, a transmitter, a transceiver, input/output (I/O) circuitry, input port(s) and/or output port(s). The communication circuit 110 is configured to transmit the first assignment, to transmit the first downlink control information on the first assignment to the wireless communication device, to transmit the second downlink control information on the second assignment to the wireless communication device, and to transmit the third downlink control information on the third assignment to the wireless communication device.

A hardware (HW) circuitry implementation of a wireless communication device and/or a radio network node may include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Another implementation a wireless communication device and/or a radio network node may be based on combination of both processor(s) and hardware circuitry in connection with suitable memory unit(s). The arrangements comprises one or more processors, memory including storage for software and data, and one or more units of hardware circuitry such as ASICs and/or FPGAs. The overall functionality is thus partitioned between programmed software (SW) for execution on one or more processors, and one or more pre-configured or possibly reconfigurable hardware circuits such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 13:
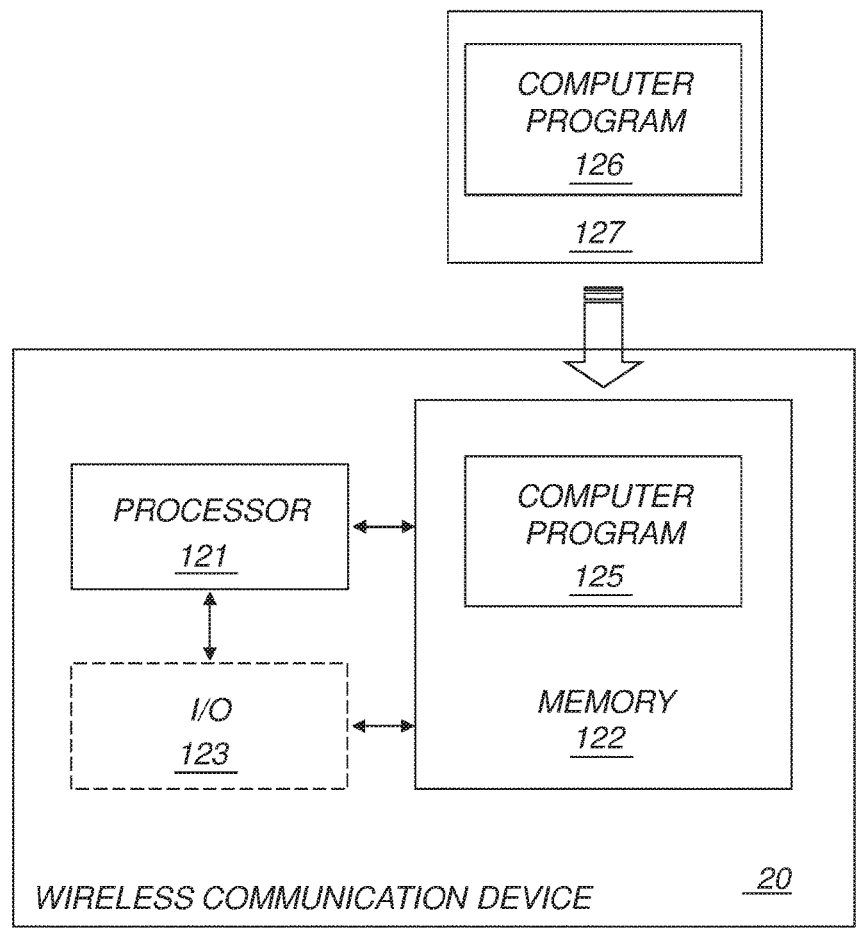
FIG. 13 is a schematic diagram illustrating an example of a computer-implementation according to an embodiment of a wireless communication device.

FIG. 13 is a schematic diagram illustrating an example of a computer-implementation according to an embodiment of a wireless communication device 20. In this particular example, at least some of the steps, functions, procedures, modules and/or blocks described herein are implemented in a computer program 125, which is loaded into the memory 122 for execution by processing circuitry including one or more processors 121. The processor(s) 121 and memory 122 are interconnected to each other to enable normal software execution. An input/output device 123 may also be interconnected to the processor(s) 121 and/or the memory 122 to enable input and/or output of relevant data such as input messages and/or resulting output messages or indications.

The term 'processor' should be interpreted in a general sense as any system or device capable of executing program code or computer program instructions to perform a particular processing, determining or computing task.

The processing circuitry including one or more processors 121 is thus configured to perform, when executing the computer program 125, well-defined processing tasks such as those described herein.

The processing circuitry does not have to be dedicated to only execute the above-described steps, functions, procedure and/or blocks, but may also execute other tasks.

In a particular embodiment, a computer-program product 127 comprises a computer-readable medium 126 comprising instructions, which when executed by at least one processor 121, cause the processor(s) 121 to perform the tasks described above.

Figure 14:
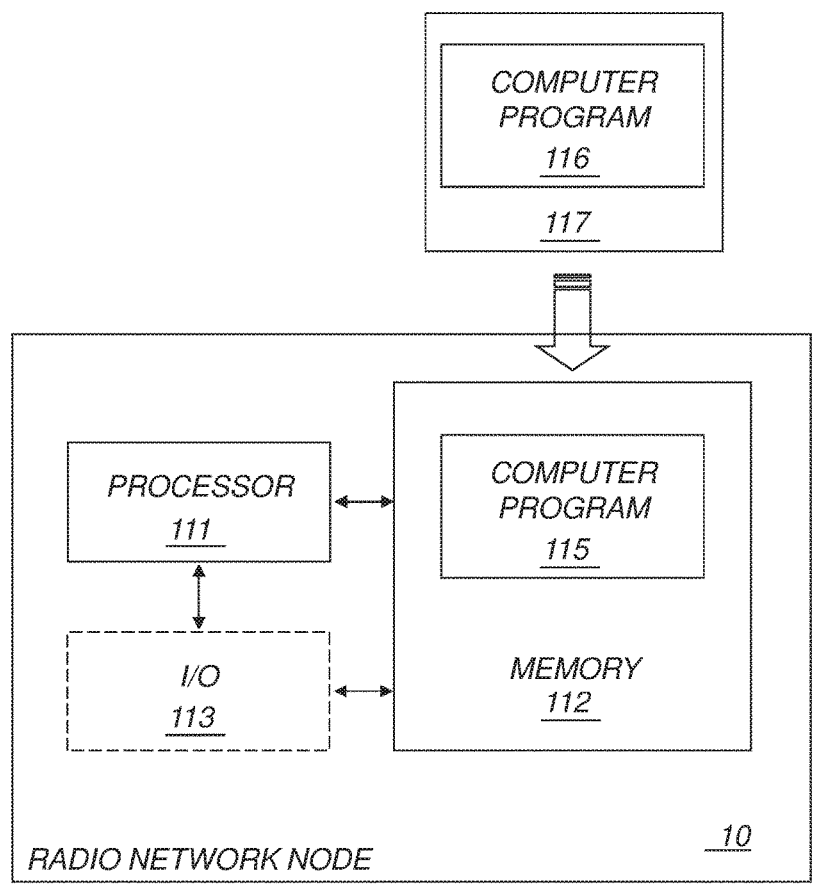
FIG. 14 is a schematic diagram illustrating an example of a computer-implementation according to an embodiment of a radio network device.

FIG. 14 is a schematic diagram illustrating an example of a computer-implementation according to an embodiment of a radio network device 10. In this particular example, at least some of the steps, functions, procedures, modules and/or blocks described herein are implemented in a computer program 115, which is loaded into the memory 112 for execution by processing circuitry including one or more processors 111. The processor(s) 111 and memory 112 are interconnected to each other to enable normal software execution. An input/output device 113 may also be interconnected to the processor(s) 111 and/or the memory 112 to enable input and/or output of relevant data such as input messages or indications and/or resulting output messages.

The term 'processor' should be interpreted in a general sense as any system or device capable of executing program code or computer program instructions to perform a particular processing, determining or computing task.

The processing circuitry including one or more processors 111 is thus configured to perform, when executing the computer program 115, well-defined processing tasks such as those described herein.

The processing circuitry does not have to be dedicated to only execute the above-described steps, functions, procedure and/or blocks, but may also execute other tasks.

In a particular embodiment, a computer-program product 117 comprises a computer-readable medium 116 comprising instructions, which when executed by at least one processor 111, cause the processor(s) 111 to perform the tasks described above.

In a particular embodiment, the computer program comprises instructions, which when executed by at least one processor, cause the at least one processor to receive a first downlink control information on a first assignment from the radio network node, the first downlink control information comprises a reference to a second assignment from the radio network node on which a second downlink control information is assigned to be received, to determine if the second downlink control information is obtainable by the wireless communication device, and to transmit an indication indicating whether or not the second downlink control information was obtainable to the radio network node.

In a particular embodiment, the computer program comprises instructions, which when executed by at least one processor, cause the at least one processor to transmit a first downlink control information on a first assignment to the wireless communication device, the first downlink control information comprises a reference to a second assignment, to transmit a second downlink control information on the second assignment to the wireless communication device, to determine whether or not the second downlink control information was obtainable by the wireless communication device, and to transmit a third downlink control information on a third assignment based on the determining whether or not the second downlink control information was obtainable in the wireless communication device.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 116; 126 may be realized as a computer program product, which is normally carried or stored on a computer-readable medium 117; 127, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 15:
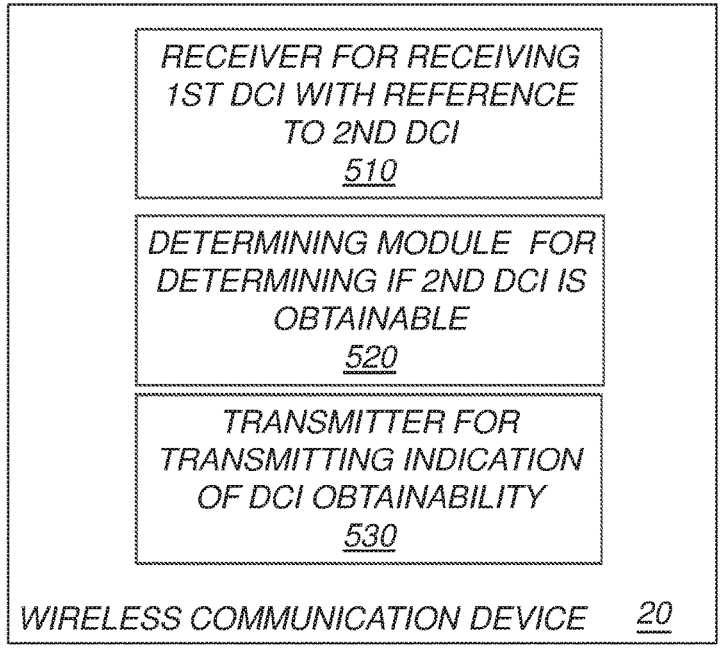
FIG. 15 is a schematic diagram illustrating an example of a wireless communication device.

FIG. 15 is a schematic diagram illustrating an example of a wireless communication device 20. The wireless communication device 20 comprises a receiver 510 for receiving a first downlink control information on a first assignment from a radio network node. The first downlink control information comprises a reference to a second assignment from the radio network node on which a second downlink control information is assigned to be received. The wireless communication device 20 further comprises a determining module 520 for determining if the second downlink control information is obtainable by the wireless communication device. The wireless communication device 20 further comprises a transmitter 530 for transmitting an indication indicating whether or not the second downlink control information was obtainable to the radio network node.

Figure 16:
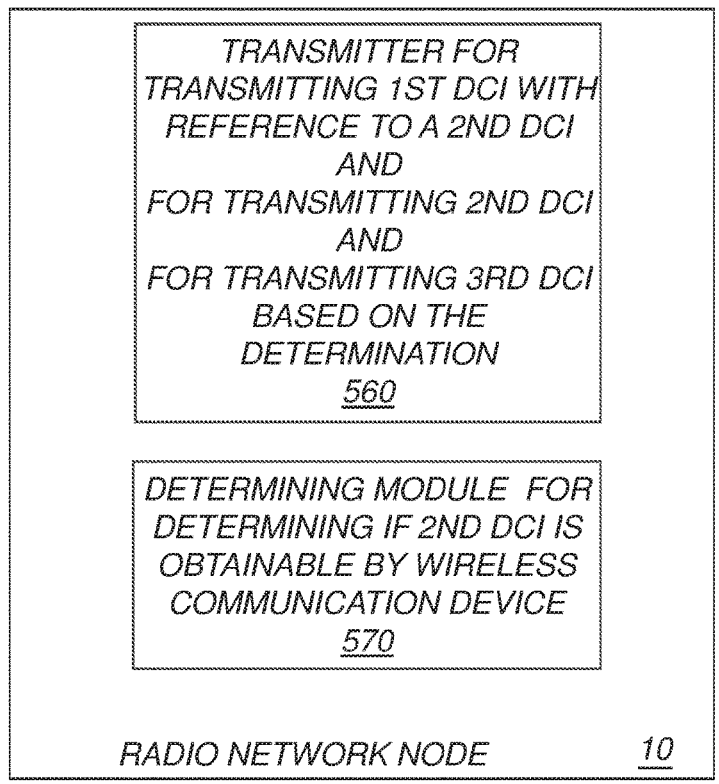
FIG. 16 is a schematic diagram illustrating an example of a radio network node.

FIG. 16 is a schematic diagram illustrating an example of a radio network node 10. The radio network node 10 comprises a transmitter 560 for transmitting a first downlink control information on a first assignment to a wireless communication device. The first downlink control information comprises a reference to a second assignment. The transmitter 560 is further for transmitting a second downlink control information on the second assignment to the wireless communication device. The radio network node 10 further comprises a determination module 570 for determining whether or not the second downlink control information was obtainable by the wireless communication device. The transmitter 560 is further for transmitting a third downlink control information on a third assignment based on the determining whether or not the second downlink control information was obtainable in the wireless communication device.

Alternatively it is possible to realize the module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

In one particular embodiment of a method in a wireless communication device for communication with a radio network node, the method comprises the steps of:

receiving a first downlink control information on a first assignment from said radio network node;

said first downlink control information comprises a reference to a second assignment from the radio network node on which a second downlink control information is assigned to be received;

determining if the second downlink control information is obtainable by the wireless communication device; and transmitting an indication indicating whether or not the second downlink control information was obtainable to the radio network node.

In a further particular embodiment, the first assignment is an assignment in a physical control channel.

In another further particular embodiment, the first assignment is an assignment in a physical data channel.

In a further particular embodiment, the second assignment is an assignment in a physical data channel.

In a further particular embodiment, the steps of determining if the second downlink control information is obtainable by the wireless communication device and transmitting an indication indicating whether or not the second downlink control information was obtainable to the radio network node are triggered by the second assignment being an assignment in a physical data channel.

In a further particular embodiment, the steps of determining if the second downlink control information is obtainable by the wireless communication device and transmitting an indication indicating whether or not the second downlink control information was obtainable to the radio network node are performed according to standard specifications for particular transmission modes.

In another further particular embodiment, the steps of determining if the second downlink control information is obtainable by the wireless communication device and transmitting an indication indicating whether or not the second downlink control information was obtainable to the radio network node are requested by a configuration message sent from the radio network node to the wireless communication device.

In yet another further particular embodiment, the steps of determining if the second downlink control information is obtainable by the wireless communication device and transmitting an indication indicating whether or not the second downlink control information was obtainable to the radio network node are requested by an indicator request in a downlink control information.

In a further particular embodiment, the indicator request comprises a resource assignment for the transmitting of the indication.

In a further particular embodiment, the indicator, if the resource assignment for the transmitting of the indication is assigned to a same assignment for an already granted uplink assignment, is incorporated in an uplink message on the same assignment for an already granted uplink assignment and the particular assignment for the transmitting of the indication is ignored.

In a further particular embodiment, the first downlink control information is comprised in a medium access control element.

In a further particular embodiment, the second downlink control information is comprised in a medium access control element.

In a further particular embodiment, the indication is transmitted on a contention-based resource.

In another further particular embodiment, the indication is incorporated into an already granted uplink assignment.

In a further particular embodiment, the transmitting of the indication is performed using binary phase shift keying signalling.

In another further particular embodiment, the transmitting of the indication is performed only if the second downlink control information was obtainable.

In yet another further particular embodiment, the transmitting of the indication is performed only if the second downlink control information was not obtainable.

In yet another further particular embodiment, the transmitting of the indication performed using ON/OFF signalling.

In a particular embodiment of a method in a radio network node for communication with a wireless communication device, the method comprises the steps of:
  transmitting a first downlink control information on a first assignment to the wireless communication device;
  the first downlink control information comprises a reference to a second assignment;
  transmitting a second downlink control information on the second assignment to the wireless communication device;
  determining whether or not the second downlink control information was obtainable by the wireless communication device; and
  transmitting a third downlink control information on a third assignment based on the determining whether or not the second downlink control information was obtainable in the wireless communication device.

In a further particular embodiment, the third downlink control information comprises an initiation of a resending of messages associated with the second downlink control information.

In a further particular embodiment, the step of transmitting a third downlink control information comprises transmitting, as a response to a determination that the second downlink control information was not obtainable by the wireless communication device, the third downlink control information.

In a further particular embodiment, the step of determining whether or not the second downlink control information was obtainable by the wireless communication device comprises receiving of an indication from the wireless communication device indicating that the second downlink control information was not obtainable by the wireless communication device.

In a further particular embodiment, the indication is received on a contention-based resource.

In a further particular embodiment, the indication is incorporated into an uplink assignment.

In another further particular embodiment, the receiving of the indication is performed using binary phase shift keying signalling.

In yet another further particular embodiment, the receiving of the indication is performed using ON/OFF signalling.

In a further particular embodiment, the step of determining whether or not the second downlink control information was obtainable by the wireless communication device comprises determining an absence of an indication from the wireless communication device indicating that the second downlink control information was obtainable by the wireless communication device when such an indication was expected to be received.

In a further particular embodiment, the first assignment is an assignment in a physical control channel.

In another further particular embodiment, the first assignment is an assignment in a physical data channel.

In a further particular embodiment, the second assignment is an assignment in a physical data channel.

A further particular embodiment comprises the further step of transmitting, to the wireless communication device, a request for transmitting an indication indicating whether or not the second downlink control information was obtainable by the wireless communication device.

In a further particular embodiment, the request for transmitting an indication is comprised in a configuration message.

In another further particular embodiment, the request for transmitting an indication is comprised in a downlink control information.

In a further particular embodiment, the indicator request comprises a resource assignment for the transmitting of the indication.

In a further particular embodiment, the first downlink control information is comprised in a medium access control element.

In a further particular embodiment, the second downlink control information is comprised in a medium access control element.

A particular embodiment of a wireless communication device is configured to:
  receive a first downlink control information on a first assignment from a radio network node;
  the first downlink control information comprises a reference to a second assignment from the radio network node on which a second downlink control information is assigned to be received;
  determine if the second downlink control information is obtainable by the wireless communication device; and
  transmit an indication indicating whether or not the second downlink control information was obtainable to the radio network node.

In a further particular embodiment, the wireless communication device comprises a processor and a memory, the memory comprising instructions executable by the processor, whereby the processor is operative to determine if the second downlink control information is obtainable by the wireless communication device.

In a further particular embodiment, the wireless communication device comprises communication circuitry configured to receive the first downlink control information on the first assignment from the radio network node, and to transmit the indication indicating whether or not the second downlink control information was obtainable to the radio network node.

A particular embodiment of a radio network node is configured to:
  transmit a first downlink control information on a first assignment to a wireless communication device;

the first downlink control information comprises a reference to a second assignment;
transmit a second downlink control information on the second assignment to the wireless communication device;
determine whether or not the second downlink control information was obtainable by the wireless communication device; and
transmit a third downlink control information on a third assignment based on the determining whether or not the second downlink control information was obtainable in the wireless communication device.

In a further particular embodiment, the radio network node comprises a processor and a memory, the memory comprising instructions executable by the processor, whereby the processor is operative to determine whether or not the second downlink control information was obtainable by the wireless communication device.

In a further particular embodiment, the radio network node comprises communication circuitry configured to transmit the first assignment, to transmit the first downlink control information on the first assignment to the wireless communication device, to transmit the second downlink control information on the second assignment to the wireless communication device, and to transmit said third downlink control information on the third assignment to the wireless communication device.

A particular embodiment of a computer program comprises instructions, which when executed by at least one processor, cause the at least one processor to receive a first downlink control information on a first assignment from a radio network node, the first downlink control information comprises a reference to a second assignment from said radio network node on which a second downlink control information is assigned to be received, to determine if the second downlink control information is obtainable by the wireless communication device, and to transmit an indication indicating whether or not the second downlink control information was obtainable by the wireless communication device.

A particular embodiment of a computer program comprises instructions, which when executed by at least one processor, cause the at least one processor to transmit a first downlink control information on a first assignment to a wireless communication device, the first downlink control information comprises a reference to a second assignment, to transmit a second downlink control information on the second assignment to the wireless communication device, to determine whether or not the second downlink control information was obtainable by the wireless communication device, and to transmit a third downlink control information on a third assignment based on the determining whether or not the second downlink control information was obtainable in the wireless communication device.

A particular embodiment of a computer-program product comprising a computer-readable medium having stored thereon a computer program according to the embodiment above.

A particular embodiment of a carrier comprising the computer program of the embodiment above, wherein the carrier is one of an electronic signal, an optical signal, an electromagnetic signal, a magnetic signal, an electric signal, a radio signal, a microwave signal, or a computer-readable storage medium.

A particular embodiment of a wireless communication device comprises:
a receiver for receiving a first downlink control information on a first assignment from a radio network node;
the first downlink control information comprises a reference to a second assignment from the radio network node on which a second downlink control information is assigned to be received;
a determining module for determining if the second downlink control information is obtainable by the wireless communication device; and
a transmitter for transmitting an indication indicating whether or not the second downlink control information was obtainable by the wireless communication device.

A particular embodiment of a radio network node comprises:
a transmitter for transmitting a first downlink control information on a first assignment to a wireless communication device;
the first downlink control information comprises a reference to a second assignment;
the transmitter being further for transmitting a second downlink control information on the second assignment to the wireless communication device;
a determination module for determining whether or not the second downlink control information was obtainable by the wireless communication device; and
the transmitter being further for transmitting a third downlink control information on a third assignment based on the determining whether or not the second downlink control information was obtainable in the wireless communication device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP Third Generation Partnership Project
ASIC Application Specific Integrated Circuits
BPSK Binary Phase Shift Keying
BTS Base Transceiver Stations
CD Compact Disc
COTS Common Off-The-Shelf
CPE Customer Premises Equipment
CPU Central Processing Units
CQI Channel-Quality Indicator
CRC Cyclic Redundancy Check
CRS Cell-Specific Reference Symbol
CSI Channel-State Information
CSI-IM CSI Interference Measurement
CSI-RS CSI Reference Symbol
DCI Downlink Control Information
DL DownLink
dPDCH direct Physical Data Channel
DSP Digital Signal Processors
DVD Digital Versatile Disc
eNB evolved Node B
ePDCCH enhanced Physical Downlink Control Channel
FDD Frequency Division Duplex FPGA Field Programmable Gate Arrays
HARQ Hybrid Automatic Repeat-reQuest
HDD Hard Disk Drive
HW hardware
I/O input/output
LEE Laptop Embedded Equipment
LME Laptop Mounted Equipment
LTE Long Term Evolution
MAC Medium Access Control
MCS Modulation and Coding Scheme
MEM memory units
MI Mutual Information
MIMO Multiple Input Multiple Output
ND Network Device
NDI New Data Indicator
NI Network Interfaces
NIC Network Interface Controller
OFDM Orthogonal Frequency-Division Multiplexing
OS Operating System
OSS Operations and Support System
PC Personal Computer
PCCH Physical Control Channel
PDA Personal Digital Assistant
PDCCH Physical Downlink Control Channel
PDCH Physical Data Channel.
PDU Protocol Data Unit
PLC Programmable Logic Controllers
PMI Pre-coding Matrix Indicator
PRB Physical Resource Block
RAM Random Access Memory
REG registers
RI Rank Indicator
ROM Read-Only Memory
rPDCH re-transmittable Physical Data Channel
RRC Radio Resource Control
RRU Remote Radio Units
RV Redundancy Version
STA Station
SW software
TM Transmission Mode
TTI Transmission Time Interval
UE User Equipment
UL UpLink
USB Universal Serial Bus
WNIC Wireless Network interface Controller

The invention claimed is:

1. A method in a wireless communication device for communication with a radio network node, said method comprising the steps of:
receiving first downlink control information on a first assignment from said radio network node, said first downlink control information being sent in a current transmission time interval and, to form a daisy chain of downlink control information, containing a nested a reference to a second assignment from said radio network node on which second downlink control information in the daisy chain is assigned to be received in a subsequent transmission time interval;
determining whether said second downlink control information is successfully received by said wireless communication device; and
transmitting a daisy chain indicator to the radio network node, for controlling early termination of the daisy chain by the radio network node, in dependence on whether the second downlink control information was successfully received.

2. The method according to claim 1, wherein said first assignment is an assignment in a physical control channel, and wherein said second assignment indicated by the nested reference contained in the first downlink control information is an assignment in a physical data channel.

3. The method according to claim 1, wherein said first assignment is an assignment in a physical data channel, and was indicated by a nested reference in a prior transmission of downlink control information to the wireless communication device in a prior transmission time interval, as part of the daisy chain of downlink control information, and wherein the second assignment is a further assignment in the physical data channel, in the subsequent transmission time interval.

4. The method according to claim 1, wherein transmitting the daisy chain indicator to the radio network node comprises transmitting the daisy chain indicator to indicate successful reception of the second downlink control information.

5. The method according to claim 4, further comprising transmitting the daisy chain indicator on a granted uplink resource, as indicated in the second downlink control information.

6. The method according to claim 1, wherein transmitting the daisy chain indicator to the radio network node comprises transmitting the daisy chain indicator to indicate unsuccessful reception of the second downlink control information.

7. The method according to claim 6, wherein transmitting the daisy chain indicator to indicate unsuccessful reception of the second downlink control information comprises transmitting the daisy chain indicator on a contention-based resource.

8. The method according to claim 1, wherein transmitting the daisy chain indicator comprises transmitting the daisy chain indicator in the subsequent transmission time interval, or in the next transmission time interval after the subsequent transmission time interval.

9. The method according to claim 8, wherein the first or second downlink control information includes an indicator request, requesting transmission of the daisy chain indicator by the wireless communication device on an assigned resource.

10. The method according to claim 9, wherein, if said assigned resource is in an uplink assignment already granted to the wireless communication device, transmitting the daisy chain indicator comprises transmitting the daisy chain indicator in an uplink message sent by the wireless communication device on the already granted uplink assignment.

11. The method according to claim 1, wherein said first downlink control information is comprised in a medium access control element.

12. The method according to claim 1, wherein said second downlink control information is comprised in a medium access control element.

13. The method according to claim 1, wherein said daisy chain indicator is transmitted on a contention-based resource.

14. The method according to claim 1, wherein said daisy chain indicator is incorporated into an already granted uplink assignment.

15. The method according to claim 1, further comprising using binary phase shift keying signaling for transmission of the daisy chain indicator.

16. The method according to claim 1, wherein transmitting the daisy chain indicator in dependence on whether the second downlink information was successfully received comprises transmitting the daisy chain indicator only if said second downlink control information was successfully received.

17. The method according to claim 1, wherein transmitting the daisy chain indicator in dependence on whether the second downlink information was successfully received comprises transmitting the daisy chain indicator only if said second downlink control information was not successfully received.

18. The method according to claim 1, further comprising using ON/OFF signaling for transmission of the daisy chain indicator.

19. A method in a radio network node for communication with a wireless communication device, said method comprising the steps of:
transmitting first downlink control information on a first assignment to said wireless communication device, said first downlink control information being sent in a current transmission time interval, and, to form a daisy chain of downlink control information, nesting a reference to a second assignment to be used by the wireless communication device in a subsequent transmission time interval for receiving second downlink control information;
transmitting the second downlink control information on said second assignment to said wireless communication device;
determining whether said second downlink control information was successfully received by said wireless communication device, based on whether the wireless communication device transmits a daisy chain indicator in association with the second downlink control information; and
transmitting third downlink control information for the wireless communication device in response to determining that the second downlink control information was not successfully received by the wireless communication device, the third downlink control information being sent outside of the daisy chain.

20. The method according to claim 19, wherein performing the early termination of the daisy chain includes an initiation of a resending of messages associated with said second downlink control information.

21. The method according to claim 19, wherein the wireless communication device transmits the daisy chain indicator responsive to not successfully receiving the second downlink control information, and wherein transmitting the third downlink control information or performing the early termination of the daisy chain comprises transmitting the third downlink control information in response to not receiving the daisy chain indicator from the wireless communication device.

22. The method according to claim 19, wherein the wireless communication device transmits the daisy chain indicator responsive to successfully receiving the second downlink control information, and wherein transmitting the third downlink control information or performing the early termination of the daisy chain comprises transmitting the third downlink control information responsive to receiving the daisy chain indicator from the wireless communication device wireless communication device.

23. The method according to claim 19, wherein the daisy chain indicator is received on a contention-based resource.

24. The method according to claim 19, wherein the daisy chain indicator is received in an uplink message sent by the wireless communication device in a previously granted uplink assignment.

25. The method according to claim 19, further comprising receiving the daisy chain indicator as binary phase shift keying signaling.

26. The method according to claim 19, further comprising receiving the daisy chain indicator as using ON/OFF signaling.

27. The method according to claim 19, wherein transmitting the first downlink control information comprises transmitting the first downlink control information via a physical control channel, wherein transmitting the second downlink control information comprises transmitting the second downlink control information via a physical data channel, and, in cases where the third downlink control information is transmitted, transmitting the third downlink control information comprises transmitting the third downlink control information via the physical data channel.

28. The method according to claim 19, wherein said first assignment is an assignment in a physical control channel and the second and third assignments are in a physical data channel.

29. The method according to claim 19, wherein the first, second, and third assignments are in a physical data channel.

30. The method according to claim 19, further comprising including in the second downlink control information a request for transmission of the daisy chain indicator by the device, and wherein transmitting the third downlink control information or performing the early termination of the daisy chain comprises performing the early termination of the daisy chain in response to not receiving the daisy chain indicator from the wireless communication device.

31. The method according to claim 19, further comprising including a resource assignment in the second downlink control information for transmission of the daisy chain indicator by the wireless communication device, and monitoring for reception of the daisy chain indicator according to the resource assignment.

32. The method according to claim 31, further comprising sending a configuration message to the wireless communication device, configuring the wireless communication device for transmission of the daisy chain indicator.

33. The method according to claim 19, wherein said first downlink control information is comprised in a medium access control element.

34. The method according to claim 19, wherein said second downlink control information is comprised in a medium access control element.

35. A wireless communication device comprising:
wireless communication circuitry configured for wireless communication with a radio network node; and
processing circuitry operatively associated with the wireless communication circuitry and configured to:
receive first downlink control information on a first assignment from the radio network node, said first downlink control information being sent in a current transmission time interval and, to form a daisy chain of downlink control information, containing a nested a reference to a second assignment from said radio network node on which second downlink control information is assigned to be received in a subsequent transmission time interval;
determine whether said second downlink control information is successfully received by said wireless communication device; and
transmit a daisy chain indicator to the radio network node, for controlling early termination of the daisy chain by the radio network node, in dependence on whether the second downlink control information was successfully received.

36. The wireless communication device according to claim 35, wherein said processing circuitry comprises a processor and a memory storing instructions executable by the processor, whereby the processor is configured as set forth in claim 35.

37. A radio network node comprising:
  wireless communication circuitry configured for wireless communication with a wireless communication device; and
  processing circuitry operatively associated with the wireless communication circuitry and configured to:
    transmit first downlink control information on a first assignment to the wireless communication device, said first downlink control information being sent in a current transmission time interval, and, to form a daisy chain of downlink control information, nesting a reference to a second assignment to be used by the wireless communication device in a subsequent transmission time interval for receiving second downlink control information;
    transmit the second downlink control information on said second assignment to said wireless communication device;
    determine whether said second downlink control information was successfully received by said wireless communication device based on whether the wireless communication device transmits a daisy chain indicator in association with the second downlink control information; and
  transmit third downlink control information for the wireless communication device in response to determining that the wireless communication device did not successfully receive the second downlink control information, the third downlink control information being sent outside of the daisy chain.

38. The radio network node according to claim 37, wherein the processing circuitry comprises a processor and a memory, said memory comprising instructions executable by the processor, whereby the processor is configured to as set forth in claim 37.

* * * * *